(No Model.) 3 Sheets—Sheet 1.
H. H. CUMMINGS.
BUTTON SEWING MACHINE.
No. 398,585. Patented Feb. 26, 1889.
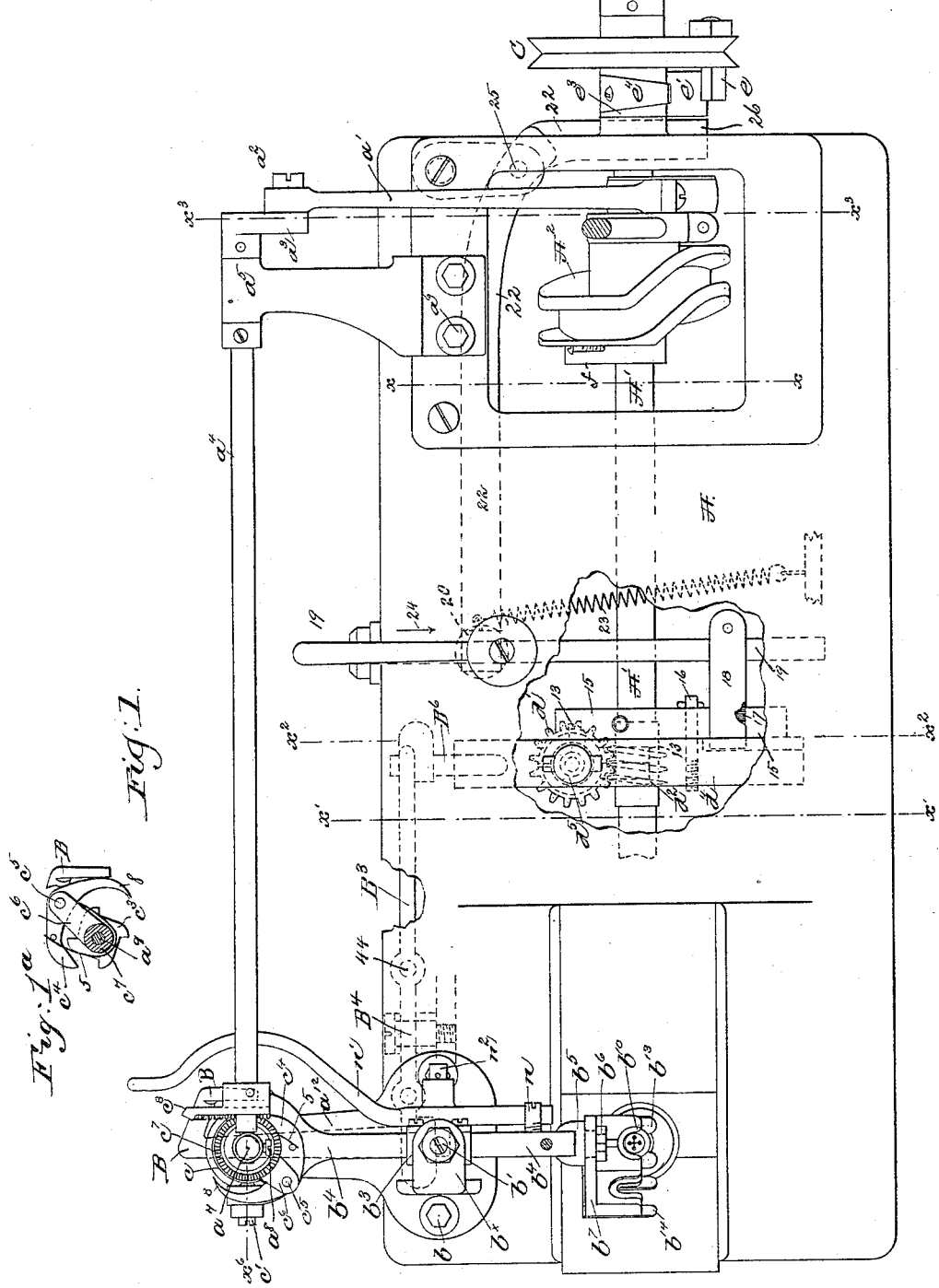

(No Model.)  3 Sheets—Sheet 2.
H. H. CUMMINGS.
BUTTON SEWING MACHINE.
No. 398,585. Patented Feb. 26, 1889.
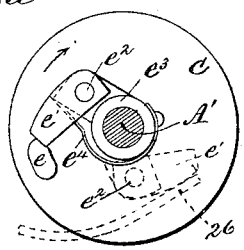
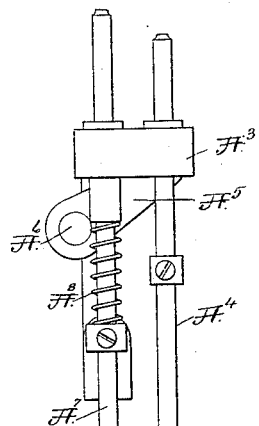
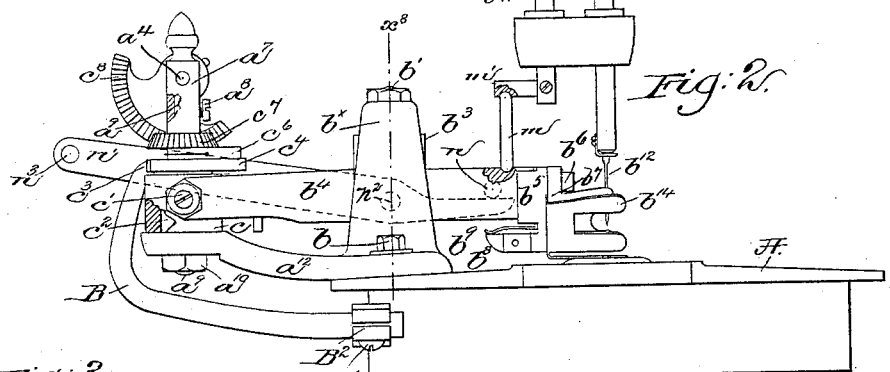
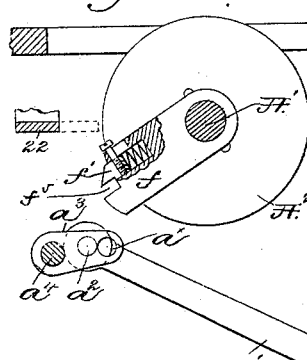
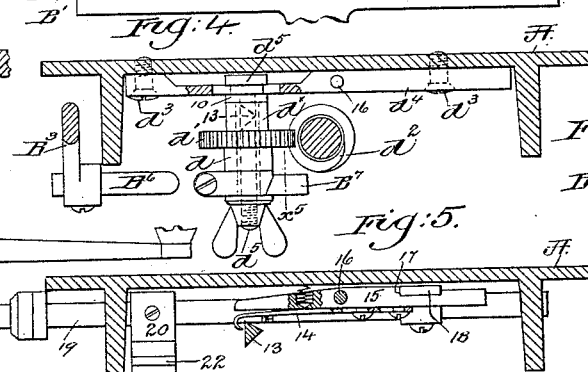
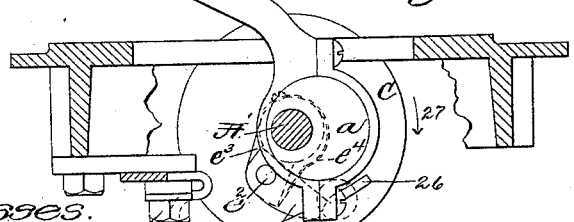
Witnesses.
Fred L. Emery
John F. C. Brinkert
Inventor.
Henry H. Cummings
by Crosby & Gregory attys.

(No Model.) 3 Sheets—Sheet 3.
H. H. CUMMINGS.
BUTTON SEWING MACHINE.
No. 398,585. Patented Feb. 26, 1889.
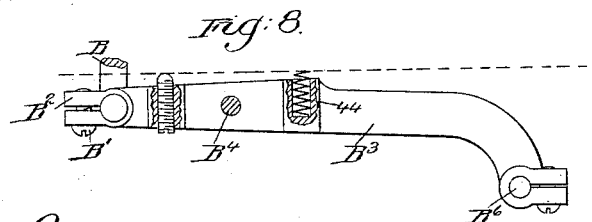
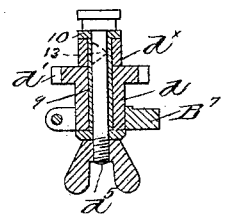
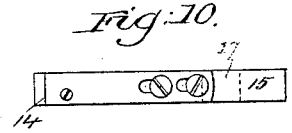
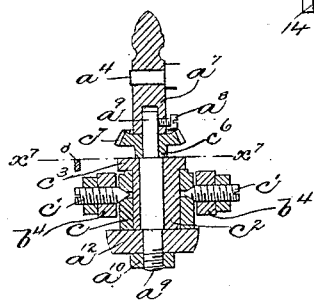
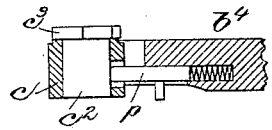
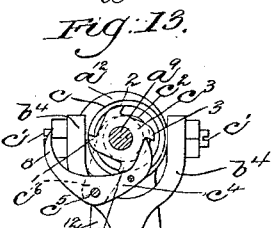
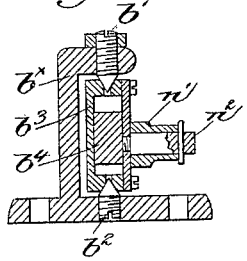
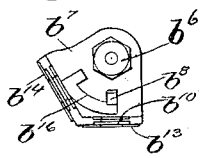
Witnesses
Fred L. Emery
John F. C. Preinkert
Inventor
Henry H. Cummings
by Crosby Gregory attys
N. PETERS, Photo-Lithographer, Washington, D. C.

UNITED STATES PATENT OFFICE.

HENRY H. CUMMINGS, OF MALDEN, ASSIGNOR TO THE UNION BUTTON SEWING MACHINE COMPANY, OF BOSTON, MASSACHUSETTS.

BUTTON-SEWING MACHINE.

SPECIFICATION forming part of Letters Patent No. 398,585, dated February 26, 1889.

Application filed December 21, 1886. Serial No. 222,165. (No model.)

*To all whom it may concern:*

Be it known that I, HENRY H. CUMMINGS, of Malden, county of Middlesex, and State of Massachusetts, have invented an Improvement in Button-Sewing Machines, of which the following description, in connection with the accompanying drawings, is a specification, like letters on the drawings representing like parts.

This invention has for its object to improve that class of apparatus employed for sewing upon clothing and other articles buttons having holes or eyes made through them from side to side.

My present invention consists, chiefly, in the apparatus employed for holding and moving the button intermittingly, the same having provision whereby a button having four eyes may be stitched either diagonally across the center of the button or from eye to eye about the button, the machine having provision whereby it may be automatically stopped when the button has received the proper number of stitches. The foot to receive the button has two (but it may have more than two) holders to receive buttons of different sizes. The foot is attached to the end of a rigid carrier-bar having as its fulcra two pointed screws, which enter recesses in a collar encircling an eccentric loose on a stud erected upon the base of the attachment-frame, the said eccentric having an intermitting rotation to effect the vibration of the front end of the carrier-bar, the said carrier-bar between its ends being extended through a slotted guide, which is pivoted in such manner as to permit the carrier-bar to slide within it longitudinally, and also to rise and fall, as may be necessary, the vibration of the carrier-bar through the eccentric causing the slotted guide to oscillate about its pivotal center, the forward end of the carrier-bar being kept down, as herein shown, by a spring upon a bar which occupies the position of the usual presser-foot bar. The "presser-bar," as I shall term it, is provided with a lug which receives one end of a rocking pin, the other end of the pin engaging loosely the carrier-bar. I have provided means for lifting the carrier and foot for the insertion and removal of the work; and to enable the button to be stitched diagonally across its center in different diametrical lines I have provided means for imparting a varying rotation to the eccentric which actuates the carrier-bar, the said means effecting at times a half-turn of the eccentric and at other times a quarter-turn, as will be described.

Figure 1, in plan view, represents the bed-plate of a sewing-machine of the Wheeler & Wilson class, it having been selected by me to illustrate my invention, the overhanging arm of the said machine and the parts contained therewith having been omitted, the bed-plate being somewhat broken out to show devices below it. Fig. 1$^a$ is a detail view to show the pawl-carrier, pawl, ratchet-wheel, and disengaging-lever. Fig. 2 is an elevation of only the parts shown at the left of Fig. 1 in full lines, the said figure having, however, added to it the front end of the overhanging arm chiefly to show the needle-bar and the presser-bar. Fig. 3 is a section of Fig. 1 in the line $x\,x$ chiefly to show the stopping device for the shaft, the dotted lines showing the second position of the shipper-lever 22. Fig. 4 is a section of Fig. 1 in the line $x'\,x'$. Fig. 5 is a section of Fig. 1 in the line $x^2\,x^2$. Fig. 6 is a section of Fig. 1 in the line $x^3$. Fig. 6$^a$ is a detail view showing the detachable connections between the loose pulley and the main shaft. Fig. 7 is a section of part of Fig. 4 in the dotted line $x^5$. Fig. 8 is a detail showing the lever which carries the pawl-disengaging device B. Fig. 9 is a vertical section of the worm-gear, the sleeve on which it turns, and of the sleeve having the dog 13; Fig. 10, a detail of the lever 15, to be referred to. Fig. 11 is a vertical section in the line $x^6$, Fig. 1, the pawl-carrier and pawl being omitted; Fig. 12, a detail showing the eccentric for moving the carrier-bar and the friction device co-operating therewith. Fig. 13 is a plan view of the devices below the dotted lines $x^7$, Fig. 11. Fig. 14 is a vertical section of Fig. 2 in the line $x^8$. Fig. 15 is a front elevation of the button-holding foot. Fig. 16 shows a button stitched from eye to eye instead of across its center, as in Fig. 1; and Fig. 17, a detail in top view of the hub $d^\times$, the gear just below it being omitted.

The bed-plate A, the main hook-shaft A', the cam $A^2$, the overhanging arm $A^3$, the needle-bar $A^4$, link $A^5$, needle-bar-operating rock-shaft $A^6$, and the presser-bar $A^7$ are all common to the Wheeler & Wilson sewing-machine, style No. 10, and so need not be herein further described.

In accordance with my invention I have added to the hook-shaft an eccentric, $a$, which is embraced by the strap of a link, $a'$, which at its outer end is adjustably attached by a suitable screw-stud, $a^2$, to an arm, $a^3$, secured to a rock-shaft, $a^4$, one end of which is supported in a bearing, $a^5$, bolted to the bed-plate by bolts $a^6$, the opposite end of the said rock-shaft being supported in a sleeve-like stud, $a^7$, attached by a set-screw, $a^8$, to a stud, $a^9$, secured by a nut, $a^{10}$, to the stand or base $a^{12}$ of the attachment.

The stand $a^{12}$, fastened to the bed-plate A by set-screws $b$, has an upright L-shaped arm, $b^\times$, which receives two pivot or point screws, $b'$ $b^2$, which serve as pivots for a guide, $b^3$, which is slotted, as shown in Fig. 14, for the passage through it freely of the carrier-bar $b^4$. The carrier-bar $b^4$ is embraced at its front end by a head, $b^5$, through which and into the carrier-bar is entered a shouldered screw-stud, $b^6$, the stud receiving upon its portion of largest diameter below its head a foot, $b^7$, the foot being mounted thereon loosely, so as to be turned to place one or the other of the button-holding springs $b^{13}$ $b^{14}$ in position under the needle, the said foot having a suitable slot, $b^{16}$, and notches, as shown in Fig. 15, to receive one end of a latch or dog, $b^8$, acted upon by a suitable spring, $b^9$, (see Fig. 2,) the latch serving as a locking device for the foot.

The foot, as herein shown, has two sections suitably slotted or cut away to receive the button $b^{10}$, the eyes of which are to be entered by the usual eye-pointed needle, $b^{12}$, carried by the needle-bar $A^4$. Underneath these slots or openings are arranged forked or other suitable springs, $b^{13}$ $b^{14}$, upon which the under side of a button rests, the said forked springs being made thin, so as to lie under the button and between it and the fabric, garment, or other article to which the button is to be stitched.

In practice the different sections of the foot will have slots or openings of different sizes to receive buttons of different diameters, as upon the same garment it is frequently necessary to apply buttons of different sizes.

The carrier-bar at its rear end beyond the guide $b^3$, through which it is entered loosely, is forked, as shown, to embrace a collar, $c$, each of the said forks receiving a point-screw, $c'$, which enters a cavity in the collar, the point-screws serving as the fulcra for the carrier in its movements. The collar $c$ embraces an eccentric, $c^2$, loose on the stud $a^9$, and at its upper end the eccentric, which may have more or less throw, according to the length of stroke desired for the front end of the carrier, has secured to it a ratchet-wheel, $c^3$, having four teeth. (Marked, respectively, 1 2 3 4 in Fig. 13.) These teeth are engaged by a pawl, $c^4$, pivoted at $c^5$ upon the under side of a pawl-carrier, $c^6$, which surrounds loosely the stud $a^9$, (see Figs. 1, 11, and 13,) said pawl-carrier having attached to it a bevel-gear, $c^7$, which is engaged and oscillated in one and then in the opposite direction by the bevel-teeth of a toothed sector, $c^8$, fast upon the rock-shaft $a^4$.

The pawl $c^4$ is acted upon by a spring, 5, (see Fig. 1,) which normally keeps the end of the pawl pressed against the periphery of the ratchet-wheel, and during such engagement the pawl at each motion of the rock-shaft $a^4$ effects a semi-rotation of the eccentric within the collar $c$, provided the screw-stud $a^2$ is in that one of the two holes in the arm $a^3$ (see Fig. 6) which is nearest the rock-shaft $a^4$; but if the screw-stud is placed in the hole $a^*$ then the movement of the rock-shaft is so much less that the eccentric is given but a quarter-turn at each oscillation of the said shaft.

With the screw-stud in the position shown in Fig. 6, a semi-rotation of the eccentric will be effected, and the carrier-bar $b^4$ will have its front end moved in such manner and at such time as to cause the foot holding the button to be vibrated in such direction that the needle $b^{12}$ will descend through one of the eyes of the button at one descent, and at its next descent the needle will descend through a second eye of the button diametrically opposite to the one through which it first descended, stitching the button, as shown in Fig. 1.

Some people prefer that the stitching to attach the button to clothing pass diametrically across the button, and so with a button having four holes it is necessary to be able to stitch automatically across the button in two different lines.

The desired number of stitches for one diametrical crossing of the button having been effected, it becomes necessary to give the carrier a different and shorter movement, in order that the needle may descend through one or the other of the unfilled holes of the button and thereafter pass through the hole diametrically opposite it. To do this it is only necessary to give the eccentric $c^2$ at the desired time a quarter-turn instead of a half-turn. This is herein also accomplished by means of a pawl-disengaging device, B, which is adjustably connected by a screw, B', with a slotted head, $B^2$, of a lever, $B^3$, pivoted at $B^4$ upon the bed-plate, the rear end of the said lever being depressed by the spring 44. (See Fig. 8.) The upturned outer end (see Fig. 2) of this pawl-disengaging device is so located with relation to the rock-shaft $a^4$ and pawl-carrier $c^6$ that when the pawl-carrier is operated by the sector $c^8$ to throw the pawl into its backward position prior to commencing a new stroke the tail 8 of the said pawl will strike against the upper end of the pawl-disengaging device and will bear against it for a sufficient length of time during the forward movement of the pawl to permit the engaging-tooth of the pawl to skip one of the teeth of the ratchet and engage the next tooth, thus giving but a quarter-turn to the eccentric. This pawl-disengaging device is thrown into operative position, as described, only at the time when the pawl referred to is to give a single quarter-turn to the eccentric, and then the pawl-disengaging device is thrown out of operative position. These pawl-disengaging devices are to come into position when half the number of stitches to be used to secure the button to clothing have been made.

As herein shown, the lever $B^3$, carrying the pawl-disengaging devices, is provided at its rear end with an adjustable pin, $B^6$, which is acted upon by a finger, $B^7$, made preferably of cam shape, (see Fig. 7,) said finger being attached to or forming a part of the sleeve $d$ (see Fig. 9) of a worm-gear, $d'$, which is acted upon by a worm, $d^2$, attached to the usual hook-shaft, $A'$.

The action of the finger $B^7$ against the under side of the pin $B^6$ throws the rear end of the lever $B^3$ upward against the stress of the spring 44 and causes the upper end of the pawl-disengaging device B to be drawn down and at the same time moved toward the stud $a^9$, about which the pawl-carrier turns, thus placing the end of the pawl-disengaging device in the range of the tail of the pawl $c^4$, as shown in Fig. $1^a$.

The under side of the bed-plate A has secured to it by screws $d^3$ a bracket, $d^4$, which is slotted to receive a bolt, $d^5$, the head of the bolt resting above the said bracket and the shank of the bolt extending downward below the bracket. (See Figs. 9 and 4.) This bolt receives upon it a sleeve, 9, having at its upper end a collar, 10, which abuts against the under side of the bracket $d^4$. This sleeve 9 receives upon it a hub, $d^*$, (shown separately in Fig. 17,) the said hub receiving also upon it the hub of the worm-gear $d'$, the latter being secured to the sleeve 9 by a suitable spline, so that the hub $d^*$ and worm-gear move in unison.

The hub $d^*$ has a projecting wedge-shaped finger, 13, (shown in full lines in Figs. 5 and 17 and in dotted lines in Figs. 1, 4, and 9,) which once in each rotation of the worm-gear $d'$ strikes against the hooked end of an adjustable toe, 14, attached to a lever, 15, pivoted upon a stud, 16, extended from one side of the bracket $d^4$, the said finger 13, when it acts upon the said pawl, causing the lever 15 to be turned upon its pivot sufficiently far to enable its notched part 17 (see Figs. 1, 5, and 10) to be moved away from and so as to release the lug 18, connected to the stop-rod 19, held in suitable bearings in the frame-work of the machine, so that it may be moved transversely of the machine.

The rod 19 has secured to it a block, 20, into which is screwed a shouldered stud, 21, which is embraced by the inner end of a shipper-lever, 22, a spiral spring, 23, attached to the said block 20, (see Fig. 1,) and also to a pin on a rigid part of the frame, normally acting to move the shipper-lever and rod 19 in the direction of the arrow 24, Fig. 1, the spring being made effective to move the rod and lever, as stated, as soon as the lever 15 is made to release the projection 18, such movement of the rod and lever 22 causing the machine to be stopped.

The belt-receiving pulley C, loose upon the hook-shaft $A'$, has at its side a stud, $e$, which, when the shaft $A'$ is to be rotated, is engaged by a dog, $e'$, pivoted at $e^2$ (see Figs. 6 and $6^a$) upon an arm of a hub, $e^3$, the said hub being secured to the shaft $A'$, and having a leaf-spring, $e^4$, which acts upon the dog $e'$ and normally keeps its free end in such position as to engage the stud $e$. To stop the machine this dog must be moved out of its engagement with the stud $e$. To do this, the inner end, 26, of the shipper-lever 22, having as its fulcrum or pivot the stud 25, is by the action of the spring 23, before described, brought into such position with relation to the dog $e'$ that the latter in its rotation with the shaft $A'$ in the direction of the arrow 27 (see Figs. 6 and $6^a$) is caused to wipe against the bent end 26 of the shipper-lever and is forced in toward the shaft $A'$, as shown in dotted lines, Fig. $6^a$, and out from its engagement with the stud $e$, such release of the dog from the stud $e$ preventing the further rotation of the shaft $A'$ by means of the belt-pulley C, and immediately thereafter the rotation of the shaft $A'$ is stopped by the arm $f$, attached to the said shaft $A'$, adjacent to the take-up cam $A^2$, the said arm in its rotation with the shaft striking the inner edge of the lever 22, the movement of the lever 22 by the spring 23 having thrown it into such position as to be in the range of movement of the said arm.

To prevent any rebound or recoil movement of the shaft $A'$, I have provided the arm $f$ with a spring-pressed latch, $f'$, which is forced back into the arm when the latch strikes the lever 22, and after the latch passes beyond the lever the said latch is immediately pressed out above the said lever, so that the edge of the latter will be received in the notch $f^5$ between the said latch and the main part of the said arm, the said lever, in conjunction with said arm, thus forming a locking device to hold the shaft positively.

In order to lift the foot for the insertion and removal of the work, I have provided the carrying bar or lever $b^4$ with a stud or projection, $n$, which is acted upon by the short arm of a lever, $n'$, mounted loosely on a stud, $n^2$, extended from the inner side of the pivoted guide-block $b^3$, the long arm of the lever $n'$ constituting the handle by which to move it, and, if desired, a rod attached to a treadle (not shown) arranged in usual manner below the machine may be connected to the lifting-lever $n'$ at $n^3$, so that the said lever may be raised by the foot of the operator.

The inner or free end of the carrier or bar $b^4$, at a point back of the foot $b^7$, receives upon it one end of a loose pin or rod, $m$, the upper end of the said rod or pin being acted upon by a projection, $m'$, extended from the presser-bar $A^7$, normally kept pressed down by the spring $A^8$.

To prevent the eccentric $c^2$ from overrunning, I have slotted the collar $c$, (see Fig. 12,) and have provided a friction device, $p$, herein shown as a spring-actuated plunger, held in the carrier $b^4$.

Instead of the eccentric $c^2$, I might use a suitable cam acting against the forked ends of the carrier-lever $b^4$.

I claim—

1. In a button-sewing machine, the combination, with a carrier bar or lever and its attached button-holding foot, of a pivoted guide for said carrier bar or lever between its ends, an eccentric or cam, a strap or collar surrounding said eccentric or cam and connected to the rear end of the said carrier bar or lever, and means for intermittingly rotating said cam or eccentric, whereby positive vibratory and longitudinal movements are imparted to the said carrier bar or lever to place different eyes of a button alternately under the needle of a sewing-machine, substantially as set forth.

2. In a button-sewing machine, the combination, with the carrier bar or lever $b^4$ and its attached button-holding foot, of a vertically-pivoted guide, $b^3$, having an opening through which the said bar or lever can slide and which is of sufficient size vertically to permit of a vertical movement of the said bar or lever therein, means for depressing and lifting the button-holding end of said bar or lever, and means for imparting positive vibratory and longitudinal movements to the latter to bring different eyes of the button alternately under the needle of the sewing-machine, substantially as set forth.

3. The carrier bar or lever and the foot or button-holder connected thereto loosely and provided with means for holding buttons of different sizes, combined with a latch or locking device to retain the said foot or holder in adjusted position, substantially as described.

4. The carrier-bar $b^4$, the collar upon which the said carrier-bar is pivoted, the eccentric within said collar, means for intermittingly rotating said eccentric, and a button foot or holder attached to said carrier-bar, combined with a pivoted block, $b^3$, through which said carrier-bar is free to slide, the said block being located between the ends of the carrier-bar and operating substantially as described.

5. The carrier-bar, a button-holder attached to the carrier-bar at one end, a collar upon which the said carrier-bar is pivoted at its other end, an eccentric within the collar, an attached ratchet-pawl, a pawl-carrier, and means to rotate it intermittingly for a half-turn, combined with a pawl-releasing device to act upon the pawl to effect a quarter rather than a semi rotation of the said eccentric, substantially as described.

6. The carrier-bar $b^4$, its attached button-holding foot, the collar upon which the said carrier-bar is pivoted, the eccentric located within the said collar, the ratchet and pawl and pawl-carrier, and the beveled gear $c^7$, combined with the rock-shaft $a^4$, the toothed sector $c^8$, and means to operate the said rock-shaft, substantially as described.

7. In a sewing-machine for stitching buttons, the main rotating shaft $A'$, worm thereon, the worm-gear $d'$, actuated thereby, the finger $B^7$, moved in unison with the said worm-gear, the lever $B^3$, having the projection $B^6$, and pawl-releasing device B, combined with the pawl $C^4$, having a tail, 8, the pawl-carrier, means to operate it, and the ratchet-wheel and eccentric, whereby change of position of the pawl-releasing device alters the effectual length of stroke of the said pawl, substantially as described.

8. In a sewing-machine, the shaft $A'$, the belt-pulley loosely mounted thereon and provided with a pin or projection, $e$, the worm attached to the said shaft, the worm-gear driven thereby, the projection or finger 13, moved in unison with the said worm-gear, the notched lever 15, actuated by said finger, the slide-rod 19, its projection engaged by the said lever, and a spring, as 23, and the shipper-lever, combined with the dog $e'$, attached to the hub $e^3$, fast on the shaft $A'$, and engaging the pin $e$ of the band-pulley, the movement of the said lever effecting such a movement of the shipper-lever as to cause its outer end to disengage the dog $e'$ from the pin or projection of the belt-pulley, permitting the latter to run loose on the shaft $A'$.

9. In a sewing-machine, the combination, with the shipper-lever 22, the shaft $A'$, the belt-pulley loose thereon, and means for detachably connecting the said shaft and pulley and for operating said shipper-lever, of the locking device consisting of the notched arm $f$, attached to said shaft and provided at its outer end with the spring-pressed latch $f'$, said locking device being arranged to engage the said shipper-lever and stop the rotation of the said shaft when the said pulley is disconnected therefrom, substantially as set forth.

10. In a machine for stitching buttons upon fabric or other material, a carrier-bar having at one end a button-holding foot and pivoted at its other end to a collar, a guide for the said carrier-bar between its ends, an eccentric within the said collar and adapted by its rotation to vibrate the carrier-bar, a ratchet connected with the said eccentric, a pawl-carrier, and a pawl, combined with means, substantially as described, whereby the eccentric may be rotated, as desired, for a greater or less distance, whereby the carrier-bar may be moved far enough at each operation of the eccentric to enable the needle to descend first through one hole in the button and then through a hole diametrically across the center of the button, or whereby the carrier may be moved to cause the needle to descend through first one and then the next hole to it in the direction of the surface of the button and not across the center of the button, substantially as described.

In testimony whereof I have signed my name to this specification in the presence of two subscribing witnesses.

HENRY H. CUMMINGS.

Witnesses:
G. W. GREGORY,
C. M. CONE.